United States Patent [19]

Peterson et al.

[11] Patent Number: 4,961,547
[45] Date of Patent: Oct. 9, 1990

[54] CLOSED FACE FISHING REEL HAVING SPEED CONE

[75] Inventors: Robert J. Peterson, Claremore; Thomas G. Kirby, Broken Arrow, both of Okla.

[73] Assignee: Swede Industries, Inc., Claremore, Okla.

[21] Appl. No.: 365,256

[22] Filed: Jun. 12, 1989

[51] Int. Cl.⁵ .......................................... A01K 89/01
[52] U.S. Cl. .................................... 242/238; 242/311
[58] Field of Search ............... 242/235, 236, 237, 238, 242/239, 240, 234, 311

[56] References Cited

U.S. PATENT DOCUMENTS

| | | | |
|---|---|---|---|
| 2,034,917 | 3/1936 | Miller | 242/227 |
| 3,028,115 | 4/1962 | Hammer | 242/240 |
| 3,185,405 | 5/1965 | Hull | 242/240 |
| 3,381,914 | 5/1968 | Taggart | 242/238 |
| 3,697,011 | 10/1972 | Christensen | 242/240 X |
| 4,448,367 | 5/1984 | Puryear | 242/239 |

Primary Examiner—Katherine Matecki
Attorney, Agent, or Firm—Head & Johnson

[57] ABSTRACT

A closed face fishing reel having a body providing means for attachment to a fishing rod, a spool supported to the body, a winding drum rotatably supported at the forward end of the spool which may be rotated for winding line onto the spool and which may be axially advanced, a speed cone supported to the body forwardly of the spool, and a winding drum having a passageway therethrough, the internal shape of which defines a line confining envelope, a separate housing secured to the body and encompassing the spool, winding drum and speed cone, and a fishing line received through the speed cone passageway and at least partially wound on the spool, the configuration of the body being independent of the line confining envelope provided by the speed cone.

13 Claims, 4 Drawing Sheets

CLOSED FACE FISHING REEL HAVING SPEED CONE

SUMMARY OF THE INVENTION

A very popular item with fishermen is the closed face fishing reel. This type of reel includes a body having a spool mounted thereto and a winding drum rotatable relative to the spool. By means of a crank and a gearing mechanism, the winding drum is rotated. A line engaging element is extendable from the winding drum to catch a line and wind the line on the spool as the winding drum is rotated. The closed face fishing reels presently available on the market typically include a housing which is secured to the reel body and encompasses the spool and winding drum and the gearing mechanism. The housing body closely fits the spool and winding drum in the forward part of the housing body and has an interior surface which defines a line confining envelope. The shape of this line confining envelope determines, at least in part, the characteristics of the reel and particularly, the characteristics of the discharge of line from the reel when a fishing bait is cast.

For reference to others who have provided closed face fishing reels, reference may be made to the following U.S. Pat. Nos.: 161,314, T. Winans, et al; 2,034,917, J. M. Miller; 2,399,863; A. J. Forestiere, Sr.; 2,600,259, P. C. Palmer; 2,929,578, R. Dell Hull; 2,932,465, L. A. Johnson; 4,448,367, John W. Puryear; 4,722,491, Seiji Myojo.

In each case these prior art references include concepts wherein the internal surface of the forward portion of the housing defines the line confining envelope. Thus, in these prior art devices the external appearance of the fishing reel is determined in part by the required line confining envelope.

The present invention is directed towards an improvement in closed face fishing reels in which the line defining envelope is independent of the reel housing. This feature allows the design of the fishing reel to have a more aesthetically pleasing housing without sacrificing reel performance characteristics.

In another arrangement, the invention provides a reel in which the line confining envelope of the reel is independent of the housing, and thereby permits changing the line confining envelope geometry while retaining the same housing geometry.

The closed face fishing reel of this invention includes a reel body and means for attachment to a fishing rod, the body having a forward end and a rearward end. A spool is supported to the reel body forward end. The spool has an axis and a forward end and a rearward end.

Rotatably supported by the reel body is a means for winding a line onto the spool in the form of a winding drum which is rotatably supported forwardly of and coaxially with the spool. The winding drum has a retractable line engaging means. When the line engaging means is extended and the winding drum rotated, line is wound onto the spool. When casting a bait or lure the line engaging means is retracted, permitting the line to be freely wound off the spool and past the winding drum.

The winding drum is rotated to retrieve the line by means of a gearing mechanism, and, in addition, the winding drum may be axially, forwardly advanced to achieve line stopping action.

A speed cone is supported to the reel fowardly of the spool and the winding drum or can encompass in whole or in part the spool and winding drum. The speed cone has a forward end and a rearward end and an opening through it. In a preferred arrangement, the opening through the speed cone is conical in basic geometry. The interior circumferential surface of the opening through the speed cone provides a line confining envelope.

A separate housing is secured to the reel and encompasses the spool, the winding drum and the speed cone. The housing has an opening in the forward end thereof which is in register with the opening in the forward end of the speed cone to receive fishing line therethrough. In a preferred arrangement, the speed cone is secured at its forward end to the housing forward end as a means of supporting it to the reel body. The speed cone may be secured in a manner to be easily replaceable so that the characteristics of the reel may be altered by changing speed cones.

In an alternate embodiment of the invention the speed cone may be provided with a circumferential elastomeric member. This member may be in the form of a brake ring received in a circumferential recess in the speed cone. This elastomeric member is engageable by the winding drum when the winding drum is axially, forwardly advanced to trap the fishing line extending through the speed cone and over the drum, as a means of controlling the discharge of line from the reel.

The brake ring is recessed in the speed cone in such a way that the line does not touch the brake ring during casting or retrieving action, but the line is forced into contact with the brake ring by the winding drum when it is pushed forward to the stop position.

A better understanding of the invention will be had by reference to the following description and claims, taken in conjunction with the attached drawings.

DESCRIPTION OF THE PREFERRED EMBODIMENT

Figure 1:
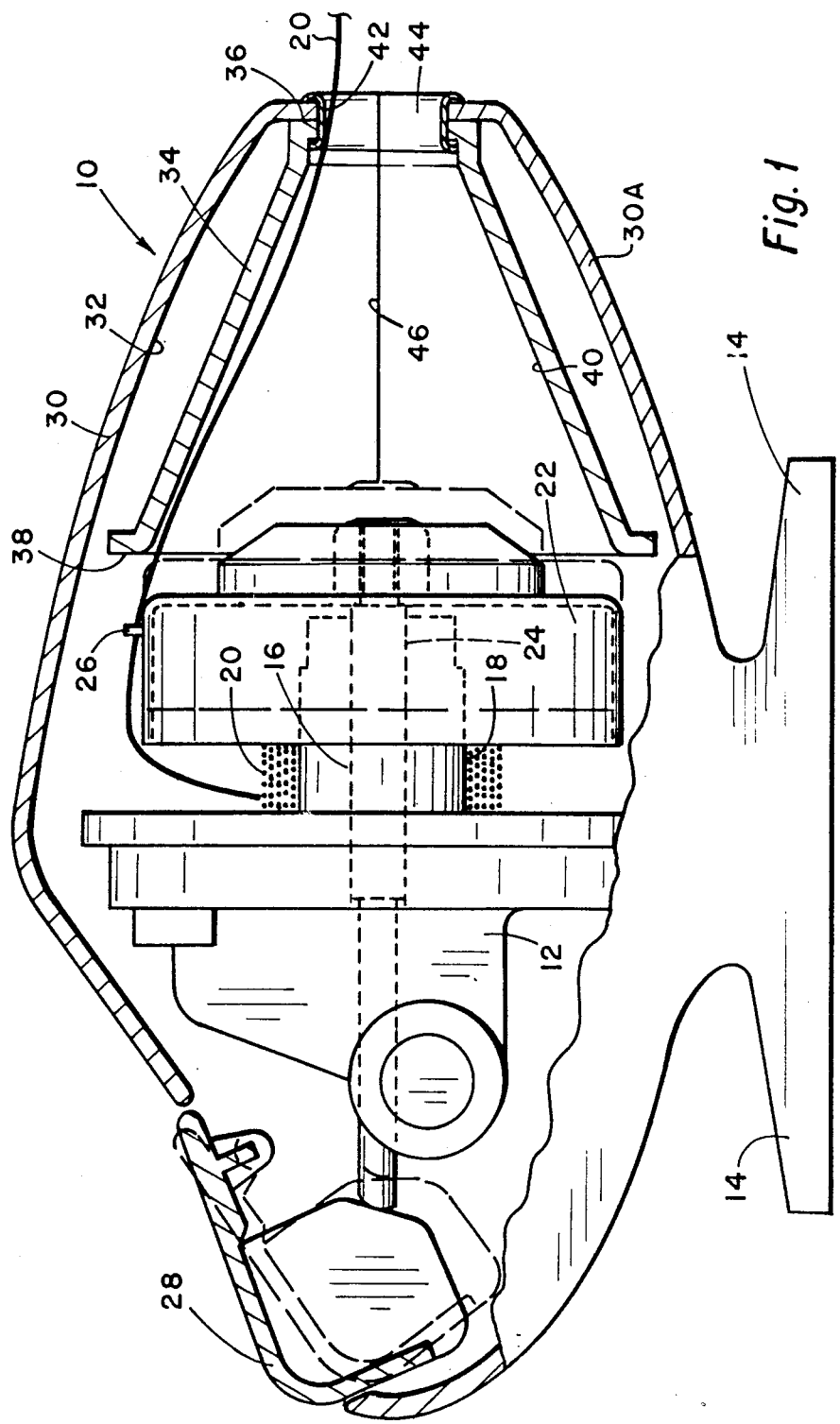
FIG. 1 is an elevational, mostly cross-sectional, view of a closed door face fishing reel embodying the principles of this invention.

Referring to the drawings and first to FIG. 1, a reel embodying the principles of this invention is generally indicated by the numeral 10. The reel includes a body 12 having means such as extending flange portions 14 whereby the reel can be mounted on a fishing rod.

Attached to the body 12 is a spool 16 having an external surface 18 onto which fishing line 20 may be wound. Rotatably supported relative to the spool is a winding drum 22 secured to a shaft 24 by means of a gearing mechanism (not shown) attached to an external crank (not shown), by which the shaft 24 may be rotated to rotate the winding drum. Extendable from the winding drum is a line engaging means 26. When this line engaging means 26 is extended, as illustrated in FIG. 1, and the winding drum 22 is rotated, line 20 is wound on the spool 16. When the line engaging means 26 is retracted, line 20 may be freely extracted from the reel by passing over the circumferential surface of the winding drum.

In addition to provision for rotation of winding drum 22, means is also provided such as by thumb button 28 to axially advance the winding drum 22 to provide line stopping action.

Secured to the body 12 is a housing 30 which encompasses the mechanism of the reel, including the spool 16, winding drum 22, gearing mechanism (not shown) and the other internal components of the reel.

All of the elements described to this point, that is, elements 12-30 are typical of prior art closed face fishing reels. In these typical fishing reels, the housing 30 has an interior surface 32 which, in the forward portion thereof, provides a line confining envelope, that is, a boundary area within which line 20 is restricted as it is unwound from spool 16 passing circumferentially over the external surface of winding drum 22. In such prior art devices, the line confining envelope is thus defined by the housing forward interior surface 32 which, therefore, limits the external configuration of the reel to that which is required for providing the desired line confining envelope geometry.

An essential element of the present invention is a speed cone 34. The speed cone may be formed of different materials, including metal, plastic or the like. A material which is compatible with the free movement of fishing line may be selected. The speed cone does not have to have the rigidity of a housing component. The speed cone has a forward end 36 and a rearward end 38, and an opening 40 therethrough. In the embodiment illustrated in FIG. 1, the opening 40 is conical and such conical opening provides a prescribed line confining geometry.

The speed cone 34 is supported relative to the reel body 12. In the illustrated and preferred arrangement, this is accomplished by supporting the speed cone forward end portion to the housing 30. Housing 30 is provided with an opening 42 therein at the forward end and opening 42 is coincident with opening 40 at the forward end 36 of the speed cone. In the illustrated arrangement of FIG. 1, a circumferential clip 44 formed of metal or stiff plastic is employed to support speed cone 34 within the housing and thereby relative to the reel body 12.

The housing 30 may be configured in a variety of ways. In the arrangement in FIG. 1 the housing is separable along a horizontal line 46, therefore, the housing includes a top portion 30 and a bottom portion 30A. In other embodiments, the housing is separable along a vertical line.

Figure 2:
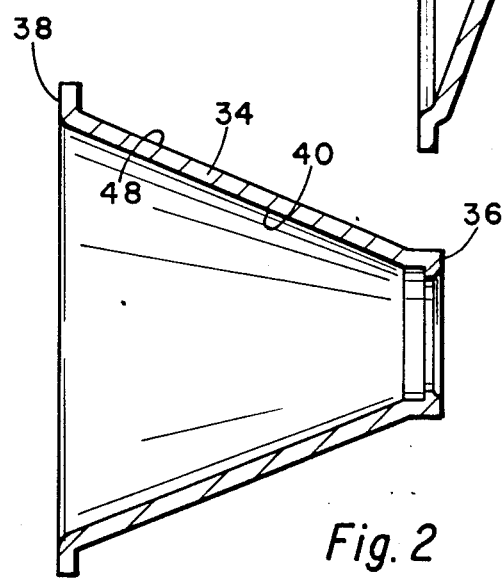
FIG. 2 is a cross-sectional view of a preferred embodiment of the speed cone, as employed in the fishing reel of FIG. 1.
Figure 8:
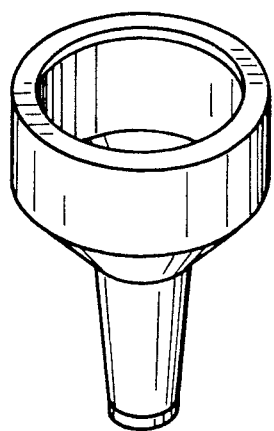
FIG. 8 is an isometric external view of still another design of a speed cone which may be employed in the reel of FIG. 1.

The configuration of the speed cone 34 may vary considerably. FIG. 2 is a separate cross-sectional view of the speed cone of the type illustrated in FIG. 1, that is, where the internal surface 34 defining the passageway through the speed cone is essentially conical, thereby providing a conical line confining envelope geometry. The external surface 48 of the speed cone as shown in FIG. 2, is in like manner, generally conical, however, the shape of the external surface is unimportant. The external surface is not contacted by the fishing line, and generally the external surface 48 is determined only by economy of manufacture.

Figure 3:
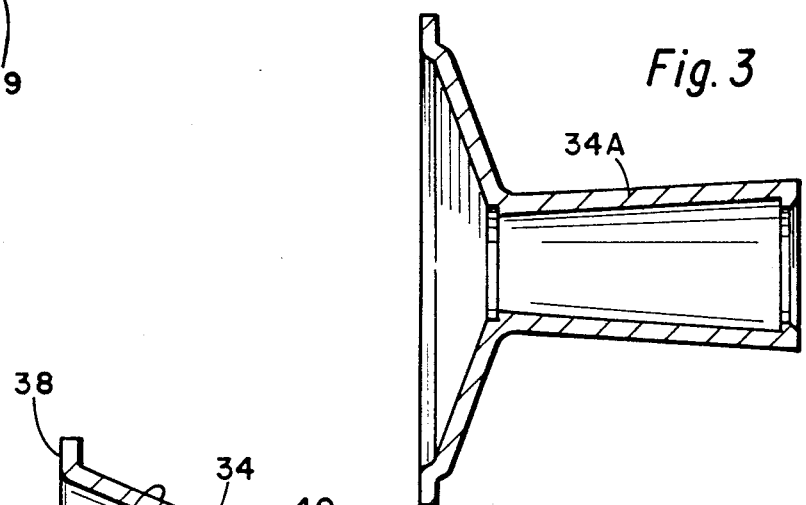
FIG. 3 is a cross-sectional view of a first alternate embodiment of the speed cone.

FIG. 3 shows an alternate embodiment of the speed cone designated by the numeral 34A. The speed cone of FIG. 3 is mounted in the same way as that for the speed cone of FIG. 2 but provides a different line casting characteristic.

Figure 4:
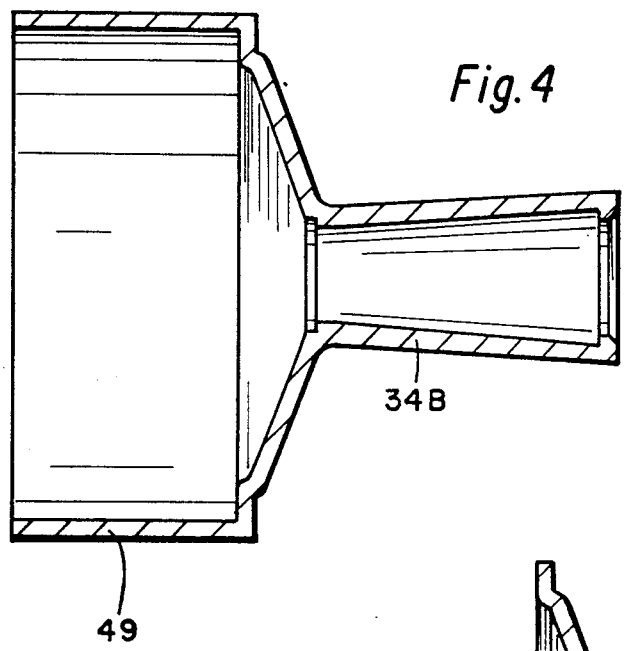
FIG. 4 is a cross-sectional view of a second alternate embodiment of the speed cone.

FIG. 4 shows a still different alternate embodiment of a speed cone, designated by the numeral 34B. FIG. 4 provides a speed cone having a conical forward portion with the geometry of that of FIG. 3, but having a rearwardly extending cylindrical portion 49 which if placed in the reel of FIG. 1, would completely encompass the winding drum 22 and spool 16, leaving an annular area between the exterior of the winding drum and the interior of the speed cone cylindrical portion 49.

Figure 5:
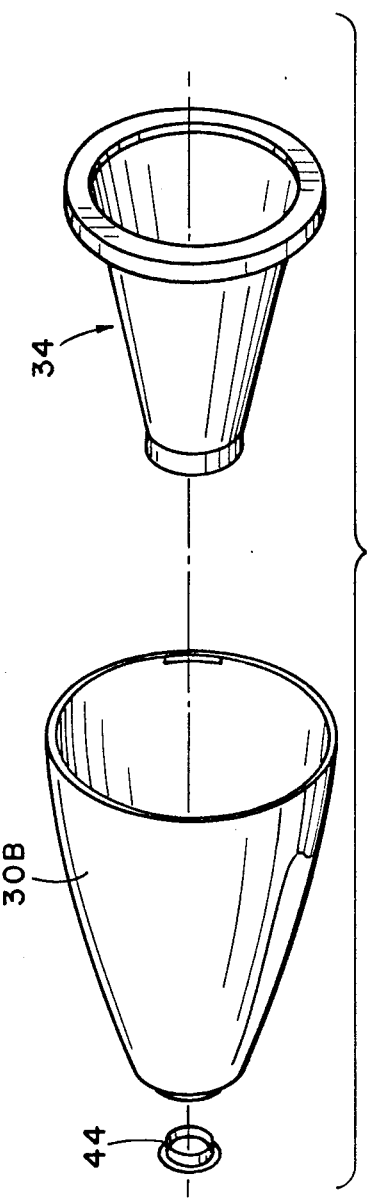
FIG. 5 is an exploded view showing an embodiment of a reel housing forward portion and a speed cone which is insertable into and attached to the housing portion.

FIG. 5 is an isometric exploded view showing a unitary reel housing forward portion 30B, and illustrating the arrangement wherein the housing is divided about a vertical plane compared to a horizontal plane as in FIG. 1. FIG. 5 shows a speed cone 34 of the type illustrated in FIG. 1, and showing its relationship to the reel housing 30B. The speed cone 34 may be supported in housing 34B such as by means of clip 44.

Figure 7:
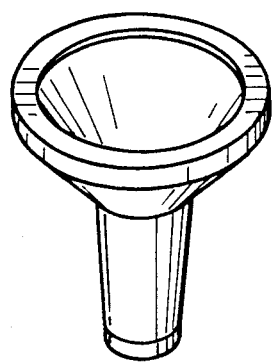
FIG. 7 is an isometric illustration of an alternate design of a speed cone which may be employed in the reel of FIG. 1.
Figure 6:
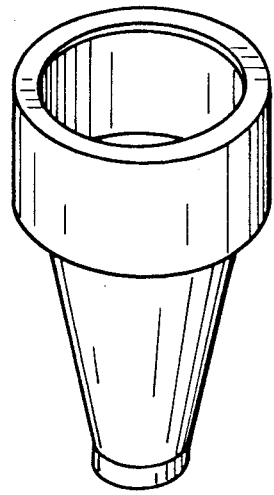
FIG. 6 is an isometric view of an alternate speed cone which may be attached to the housing in FIG. 5, illustrating how a variety of speed cones may be employed with the same housing structure.

FIG. 6 is an isometric external view of an alternate design of a speed cone which may be employed in the reel of FIG. 1. FIG. 7 is a still different alternate design of a speed cone, and the same is true of FIG. 8. Thus, FIGS. 2, 3, 5, 6, 7 and 8 are illustrative of the great variety of speed cones which may be employed in a fishing reel all while retaining the same housing 30. Therefore, unlike prior fishing reels, the characteristics of the fishing reel may be changed independently of the housing design.

Figure 10:
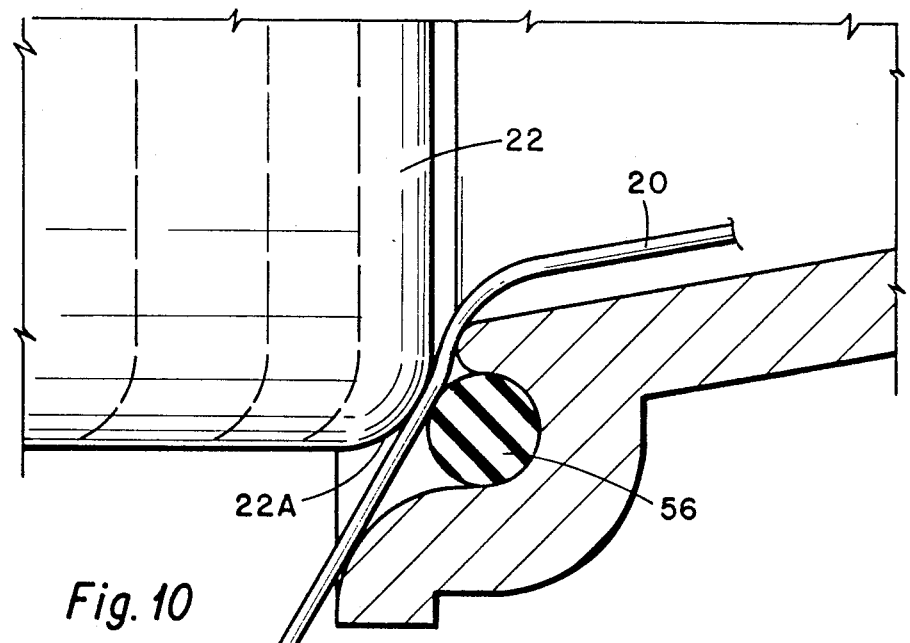
FIG. 10 is a fragmentary enlarged cross-sectional view of a portion of the speed cone of FIG. 9, having the elastomeric member as a part thereof and showing the winding drum as forwardly advanced to pinch a fishing line against the elastomeric member, illustrating the means of utilizing an elastomeric member as a part of the speed drum for improved line control.
Figure 9:
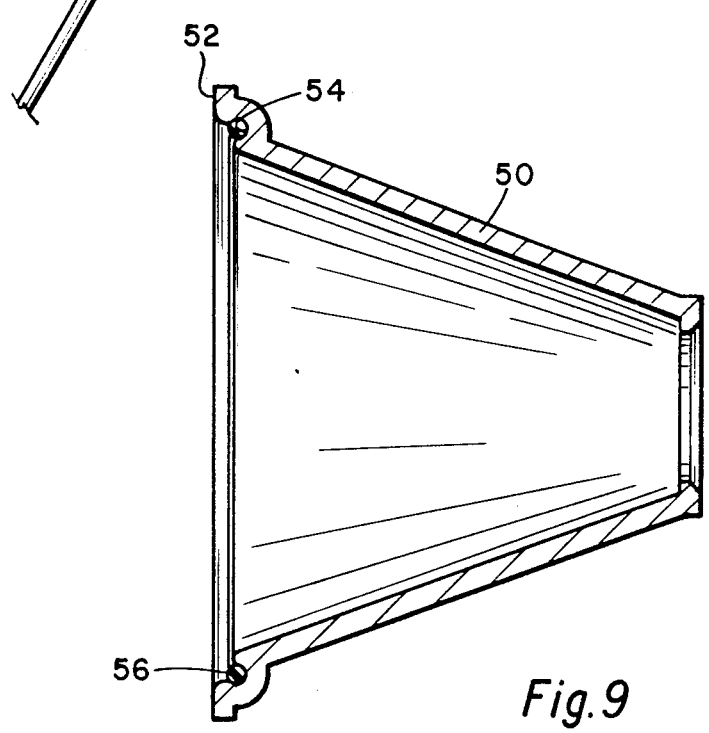
FIG. 9 is a cross-sectional view of a speed cone of the type employed in FIG. 1, and showing the provision of a circumferential elastomeric member.

FIGS. 9 and 10 show an alternate embodiment of the invention. In many closed face fishing reels of the type presently on the market, line stopping action is accomplished by axially advancing the winding drum 22 to pinch the line between the exterior of the drum and the interior surface of the housing. To provide an improved line stopping action, an alternate speed cone 50 has, adjacent its rearward circumferential surface 52, a circumferential groove 54. Received in groove 54 is an elastomeric member in the form of a brake ring 56. As shown in FIG. 10, when the winding drum 22 is axially advanced, the forward circumferential edge 22A pinches the line 20 against brake ring 56. This pinching action may be only sufficient to slow down the travel of line 50 during casting action or to completely stop the extraction of line from the reel.

As illustrated in FIG. 10, the brake ring 56 is recessed so that it is not engaged by line 20 either during casting or during retrieval of the line. Line 20 engages braking ring 56 only when it is forced into contact with it when the winding drum 22 is fowardly advanced to the stop position. Further, it can be seen that this recessed elastomeric brake ring 56 could be employed in some other part of the fishing reel, such as the cover, rather than as a part of the speed cone.

The elastomeric member may be another shape, such as, the arrangement wherein the speed cone rearward end portion 52 is dipped completely into a liquid which solidifies to form an elastomeric surface.

Thus, the reel described herein provides a unique arrangement which enables the designer to select a predetermined line confining envelope geometry which is completely independent to the housing geometry. This permits not only improved reel performance but more aesthetic external reel appearance, and the improved aesthetic appearance is obtained without sacrificing reel performance. In the arrangement wherein the speed cone is interchangeable, the user of the reel having a variety of speed cones can select that which provides the type of casting action desired.

The claims and the specification describe the invention presented and the terms that are employed in the claims draw their meaning from the use of such terms in the specification. The same terms employed in the prior art may be broader in meaning than specifically employed herein. Whenever there is a question between the broader definition of such terms used in the prior art and the more specific use of the terms herein, the more specific meaning is meant.

While the invention has been described with a certain degree of particularity it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed is:

1. A closed face fishing reel comprising:
   a reel body and means for attachment to a fishing rod, the body having a forward end and a rearward end;
   a spool means supported to the reel body having a spool axis, a forward end and a rearward end;
   means for winding fishing line onto said spool means, such winding means being rotatable about the axis of said spool means;
   a cone means supported relative to said reel body adjacent to and forwardly of said spool means, the cone means having a rearward end of a diameter at least as large as said spool means and a smaller diameter forward end, and an opening therethrough providing a smooth interior circumferential surface forming a line confining envelope that is co-axial with said spool axis;
   said fishing line having a portion thereof wound on said spool and the free end extending past said winding means and said spool means and through said cone means from the rearward through the forward end thereof; and
   an outer housing removably supported relative to said reel body, said outer housing encompassing and spaced from said cone means, said outer housing having a forward opening therein co-axial with said opening of said cone means.

2. A closed face fishing reel according to claim 1 wherein said cone means includes means for securing its forward end to said outer housing.

3. A closed face fishing reel of claim 2 wherein said means for securing includes a circumferential clip.

4. A closed face fising reel according to claim 1 wherein said line confining envelope provided by said cone means is substantially conical.

5. A closed face fishing reel according to claim 1 wherein said line confining envelope provided by said cone means opening is at least in part substantially conical.

6. A closed face fishing reel according to claim 1 including means for removably attaching said cone means to said reel body whereby cone means having varying line confining envelope geometrics may be readily interchanged.

7. A closed face fishing reel according to claim 1 wherein said means for winding line onto said spool means is axially displaceable and wherein said cone means is adjacent said winding means and is engageable by said winding means to provide line stopping action.

8. A closed face fishing reel according to claim 7 wherein said cone means includes a circumferential elastomeric means thereon, said elastomeric means being engageable by said winding means when said winding means is axially advanced.

9. A closed face fishing reel according to claim 8 including means for axially advancing said winding means and wherein said cone means has a circumferential groove and wherein
   said circumferential elastomeric means is received in said circumferential groove and positioned to be engaged by said winding means when it is axially advanced.

10. A closed face fishing reel according to claim 9 wherein said circumferential groove and said brake ring are recessed whereby said fishing line does not touch said brake ring except when said line is forced into contact with said brake ring when said line winding means is axially advanced.

11. A closed face fishing reel of claim 1 wherein said cone means includes a rearward portion that substantially encompasses said spool means.

12. The reel of claim 11 wherein said rearward portion is substantially cylindrical.

13. A closed face fishing reel comprising:
   a reel body and means for attachment to a fishing rod, the body having a forward end and a rearward end;
   a spool supported to the reel body having a spool axis, a forward end and a rearward end;
   means for winding fishing line onto said spool, such winding means being rotatable about the axis of said spool;
   a cone means supported relative to said reel body, said cone means having a forward end and a rearward end, and an opening therethrough providing an interior circumferential surface forming a line confining envelope;
   a fishing line having a portion thereof wound on said spool and the free end extending past said winding means and through said opening of said cone means from the rearward through the forward end thereof;
   a separate housing supported relative to said body and encompassing said cone means, the housing having a forward opening therein in register with said cone means opening;

said cone means including a circumferential groove to receive a circumferential elastomeric means therein and positioned to be engaged by said winding means when it is axially advanced; and said circumferential groove and said elastomeric means being recessed whereby said fishing line does not touch said elastomeric ring except when said line is forced into contact with said elastomeric ring when said line winding means is axially advanced.

* * * * *